Figure 1:
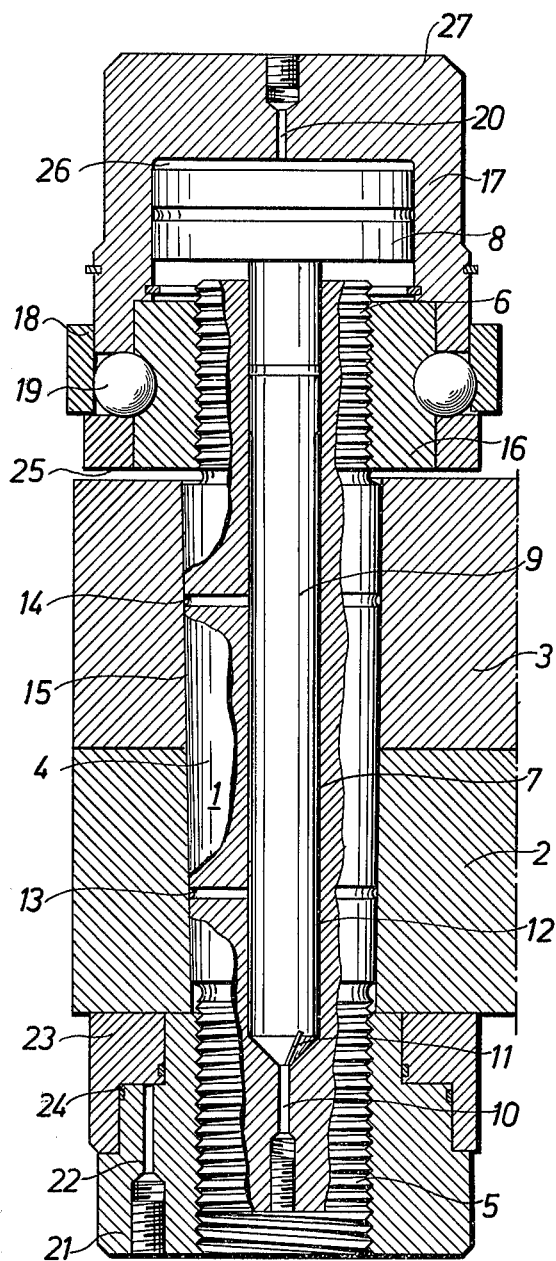

United States Patent [19]

Fredriksson et al.

[11] 3,947,948
[45] Apr. 6, 1976

[54] METHOD OF ASSEMBLING AND DISASSEMBLING A PRE-TENSIONED SCREWED JOINT AND A DEVICE FOR CARRYING OUT THE METHOD

[75] Inventors: Roland Fredriksson; Ingvar Eklund, both of Motala, Sweden

[73] Assignee: Aktiebolaget Motala Verkstad, Motala, Sweden

[22] Filed: Dec. 5, 1974

[21] Appl. No.: 529,935

[30] Foreign Application Priority Data

Dec. 14, 1973 Sweden ............................. 7316955

[52] U.S. Cl. ................. 29/427; 85/32 R; 254/29 A; 403/15; 403/31
[51] Int. Cl.[2] ........................................ B23P 19/02
[58] Field of Search ............. 29/426, 427, 428, 238, 29/244, 252, 283, 200 R, 200 P, 200 D, 452, 446; 85/32, 9, 61; 254/29 A; 403/15, 31

[56] References Cited

UNITED STATES PATENTS

| | | | |
|---|---|---|---|
| 3,077,335 | 2/1963 | Singleton | 254/29 A |
| 3,424,080 | 1/1969 | Pappas | 85/32 R |
| 3,463,044 | 8/1969 | Rossman et al. | 85/32 R |
| 3,494,592 | 2/1970 | Meschonat et al. | 254/29 A |
| 3,679,173 | 7/1972 | Sherrick et al. | 254/29 A |
| 3,811,653 | 5/1974 | Persicke | 254/29 A |
| 3,841,193 | 10/1974 | Ito | 85/9 R |
| 3,844,533 | 10/1974 | Markiewicz | 254/29 A |

Primary Examiner—C. W. Lanham
Assistant Examiner—James R. Duzan
Attorney, Agent, or Firm—Oblon, Fisher, Spivak, McClelland & Maier

[57] ABSTRACT

A pre-tensioned, screwed joint is assembled or disassembled by using a piston and rod arrangement to elastically extend the screw while a nut is applied or removed.

9 Claims, 3 Drawing Figures

METHOD OF ASSEMBLING AND DISASSEMBLING A PRE-TENSIONED SCREWED JOINT AND A DEVICE FOR CARRYING OUT THE METHOD

The present invention relates to a method of assembling and disassembling a radially and axially pre-tensioned screwed joint for transmitting both tensile forces and shear forces. The invention also relates to a device for carrying out the method. (By "screwed joint" is meant here joints which are provided with nuts which are intended to co-act with screw-like fasteners, said joints also being known as "bolted joints"). Screwed joints of the type envisaged are used, for example, in conjunction with flange couplings for joining together large shafts which are intended to transmit both tensile or tractive forces and shear forces, such as used in the shaft bearings of ships for transmitting torque from ship propelling machinery to a propeller, and in which axial forces from the propeller are taken up by the shaft.

Hitherto, screwed joints of this type have been provided with screws or bolts having cylindrical and conical shanks which are arranged to fit grippingly in accurately machined cylindrical or conical bores in the couplings of the shaft bearings. The frictional and deformation force occurring between the outer surface of the screw and the surrounding surface of the respective bore in the coupling when the screw joint is assembled, causes the radial and axial pre-tensioned forces to be restricted. A further disadvantage with known screwed joints of this type is that close tolerances are required between respective screws and bores in order to obtain the desired fit therebetween; the realization of these tolerances is both costly and time consuming.

The screws of the known screwed joint have fixed heads, thereby complicating the manufacture of the screws, insomuch as said screws must be fitted so that the necessary clearance is obtained to enable the joint to be requisitely tightened, it being required that the head of the screw bears hard against the coupling flange in the assembled condition of the screwed joint.

It is known from the Swedish Pat. No. 322,948, 332,320 and 360,714 to pre-tension the screws by means of a pressure medium so that the screw threads are relieved of load during the assembly of the screwed joint, and it is further known from the Swedish Pat. No. 361,513 to supply a pressure medium between an inner surface and an outer surface in a joint. The devices disclosed in these publications, however, cannot be considered to solve the aforementioned problems.

An object of the present invention is to provide a method and a device whereby an axially and radially pre-tensioned screwed joint can be produced, assembled and disassembled more readily and less expensively than was previously possible.

Figure 2:
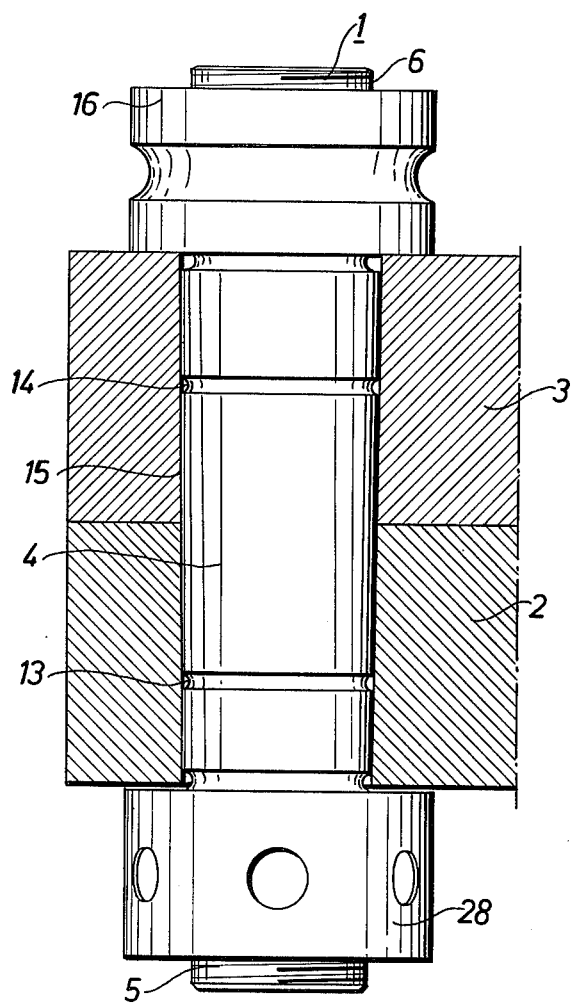
Figure 3:
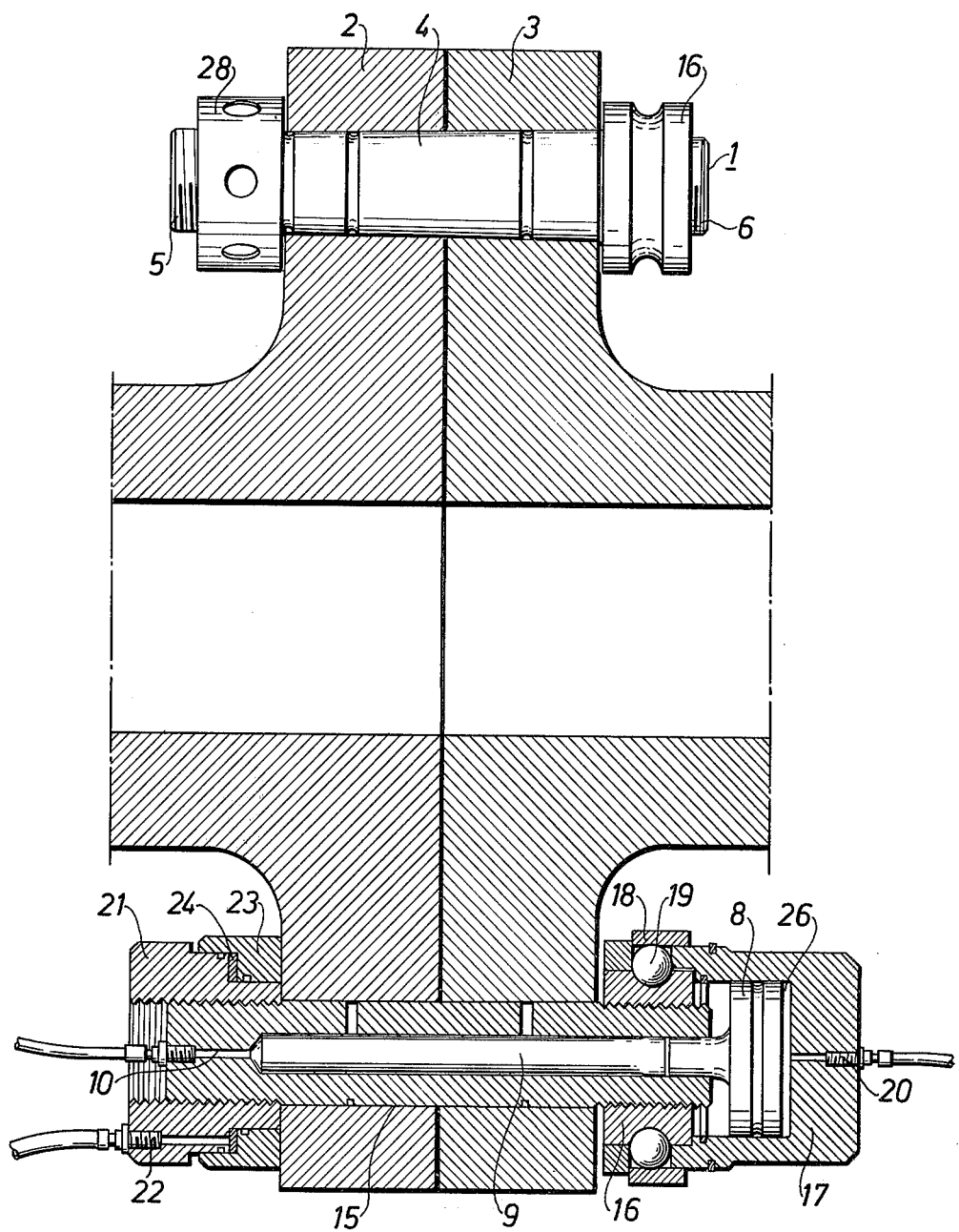

The invention will now be described in more detail with reference to the accompanying drawing, in which FIG. 1 is an axial sectional view through a screwed joint having an arrangement according to the invention, FIG. 2 shows the screwed joint of FIG. 1 in an assembled condition and FIG. 3 is an axial sectional view through a flanged coupling having a screwed joint in the process of being assembled and a further, assembled screwed joint.

With the illustrated embodiment, a screw 1, which is arranged to hold together two coupling halves 2 and 3, comprises a slightly conical intermediate portion 4 which is intended to fit into co-broached conical holes in the coupling halves 2 and 3, and two threaded portions 5 and 6. From the larger portion of the screw 1 there is arranged a hole 7 in which a pre-tensioning rod 9 having a plunger 8 is arranged. A smaller hole 10, which is provided with screw-threaded connection means for a pressure medium line, is arranged in the smaller portion of the screw and opens out in the hole 7. Extending from the hole 10 are grooves 11 through which pressure medium can be conducted into a gap 12 located between the pre-tensioning rod 9 and the wall of the hole 7 in the screw 1, and from there through channels 13, 14 to a gap 15 located between the screw 1 and the coupling halves 2, 3.

The screw 1 has screw threads provided at both ends thereof. On the large end of the screw there is a nut 16 to which a cylinder 17 having a wall 27 is secured with a quick-coupling arrangement 18, 19. Mounted in the cylinder 17 is a piston 8 which is connected to the pre-tensioning rod 9. Between the wall 27 and the piston 8 there is located a space 26. To provide for the supply of pressure medium to the space 26 between the wall 27 and the piston 8 there is provided a hole 20 which is provided with screw-threads for connection to a pressure medium line. The pre-tensioning rod 9, the piston 8 and the cylinder 17 with the wall 27 constitute a pre-tensioning device.

A threaded forcing device 21 is screwed onto the small end of the screw 1 and is provided with a hole 22 provided with threads for connection to a pressure medium line. Between the forcing device 21 and the coupling half 2 there is provided a distance ring 23 which is so adapted that a gap 24 for receiving pressure medium is arranged between said forcing device 21 and said distance ring 23.

When assembling the joint, the screw 1 is inserted in the holes in the coupling halves 2, 3. The nut 16 is then screwed onto the large end of the screw 1 until the requisite tightening clearance 25 is obtained between the coupling half 3 and the nut 16 to permit the desired degree of tightness. The pre-tensioning rod 9 with the piston 8 and the cylinder 17 are mounted on the nut 16, and are locked thereto by means of the quick-coupling device 18, 19. A line for supplying pressure medium to the space 26 is connected to the hole 20. The forcing device 21 provided with the distance element 23 is screwed onto the threads of the small end of screw 1, whereafter pressure medium lines are connected to the holes 10 and 22.

The pressure medium is then supplied through the hole 10, the grooves 11, the gap 12 and the channels 13, 14 in between the outer surface on the intermediate portion 4 of the screw 1 and the inner surfaces of the coupling halves 2 and 3. At the same time pressure medium is passed through the hole 20 to the space 26 and through the hole 22 to the space 24. The pressure of the pressure medium is increased, whereby the screw 1 is drawn under the influence of the pre-tensioning rod 9 into the holes in the coupling halves 2 and 3 until the nut 16 lies against the surface of the flange of the coupling half 3. The pressure in the space 24 causes the screw to be drawn into the holes, this being facilitated in that the pressure in the gap 15 widens said gap.

Subsequent to the nut 16 being brought into contact with the flange surface of the coupling half, the pressure on the pressure medium is further increased so that, under the influence of the pre-tensioning rod 9, the screw 1 is elastically extended, therewith pre-tensioning the screw. The pressure in the gap 24 between the forcing device 21 and the distance ring 23 is then relieved and the pressure in gap 15 between the contact surfaces of the coupling halves and the screw is also relieved while the pressure on the piston 8 for the pre-tensioning rod 9 is maintained.

The forcing device 21 and the distance ring 23 are now dismantled and replaced with a nut 28, which is tightened with a hook wrench or a tommy-bar. The pre-tensioning device 9, 8, 17 is then unloaded and dismantled.

When wishing to dismantle the screwed joint, the pre-tensioning device 9, 8, 17 is mounted on the nut 16. Pressure medium of the requisite pressure is supplied through the hole 20 to the pre-tensioning device, so that the nut 28 can be loosened by hand to provide a clearance between the coupling half 2 and the nut 28. The pre-tensioning device is then unloaded. Pressure medium is then supplied through the hole 10 into the gap 15 between the outer surface of the intermediate portion 4 and the inner surfaces of the coupling halves 2 and 3. In this way the gap 15 is widened so that the screw can be removed by hand.

The invention is not restricted solely to joints having conical holes and screws with a conical intermediate portion, but can be applied wholly or partially to other types of pre-tensioned joints, for example joints having cylindrical screws and holes to facilitate, during assembly, forcing of the screws into the holes and to provide pre-tensioning of the joint. In addition, the invention can also be applied when dismantling such joints, in which the intermediate portion of the screws has jammed owing to, for example, corrosion on the fitting portions.

We claim:

1. A method of assembling and disassembling a pre-tensioned screwed joint, which includes a screw threaded at both ends thereof and two joint portions through which said screw passes, comprising the steps of:
   securing a first nut upon one end of said screw externally of said joint portions;
   securing a threaded member upon the other end of said screw externally of said joint portions and interposing a spacer member between said threaded member and said joint portions;
   disposing a piston rod, having a piston head secured thereto, within said one end of said screw;
   introducing a pressure medium into an annular gap formed between said threaded member and said spacer member whereby said screw is drawn through said joint portions in the direction from said one end of said screw to said other end of said screw so as to tightly abut said first nut with the external surface of said joint portions at said one end of said screw;
   supplying a pressure medium to said piston head whereby said piston rod engages an internal portion of said screw and elastically elongates said screw;
   relieving said pressure within said gap;
   removing said threaded member and said spacer member from said other end of said screw;
   securing a second nut upon said other end of said screw so as to tightly abut the external surfaces of said joint portions at said other end of said screw; and
   relieving said pressure applied to said piston head.

2. A method as set forth in claim 1, further comprising:
   introducing a pressure medium into a longitudinal, annular gap formed between said screw and the internal wall portions of said joint portions, whereby said longitudinal annular gap is widened so as to facilitate said drawing and elastic elongation of said screw within said joint portions.

3. A method as set forth in claim 2, wherein:
   said pressure medium is supplied to said annular gap simultaneously with the supply of pressure medium to said longitudinal annular gap; and
   said pressure mediums within said annular gap and said longitudinal annular gap are simultaneously relieved.

4. A method as set forth in claim 2, further comprising:
   re-supplying pressure medium to said piston head so as to again elongate said screw;
   unscrewing said second nut;
   re-introducing pressure medium into said longitudinal gap; and
   removing said screw.

5. A pre-tensioned screwed joint comprising:
   two joint portions adapted to be secured together;
   a screw, threaded at both ends thereof, passing through a bore provided within said joint portions, said threaded ends of said screw projecting externally of said joint portions;
   a blind bore provided within one end of said screw;
   a piston rod, having a piston head secured thereto, disposed within said blind bore;
   a first nut secured to said one end of said screw;
   a threaded member secured to said other end of said screw;
   a spacer member interposed between said threaded member and the external surface of said joint portions at said other end of said screw;
   first fluid pressure means for supplying a pressure medium into a gap formed between said threaded member and said spacer member for moving said screw longitudinally in the direction from said one end of said screw to said other end of said screw whereby said first nut will tightly abut the external surface of said joint portions at said one end of said screw;
   second fluid pressure means for supplying a pressure medium to said piston head for moving said piston rod within said blind bore so as to elastically elongate said screw; and
   second nut means, for replacing said threaded member and said spacer member, secured to said other end of said screw and tightly abutting the external surface of said joint portions at said other end of said screw.

6. A pre-tensioned screwed joint as set forth in claim 5, wherein said first fluid pressure means comprises:
   a cylinder secured to said first nut, said piston head being disposed within said cylinder; and
   a pressure medium connection provided within said cylinder for supplying said pressure medium to said piston head.

7. A pre-tensioned screwed joint as set forth in claim 5, further comprising:
   fluid pressure means for supplying fluid pressure to a longitudinal annular gap defined between said screw and the internal wall portions of said joint portions for widening said longitudinal gap, whereby said movement of said screw within said joint portions is facilitated.

8. A pre-tensioned screwed joint as set forth in claim 6, wherein:
said cylinder includes a ball locking mechanism which is adapted to cooperate with a peripheral groove formed within said first nut,
whereby said cylinder is secured to said first nut.

9. A pre-tensioned screwed joint as set forth in claim 5, wherein:
said threaded member includes externally stepped shoulder portions; and
said spacer member includes internally stepped portions for mating with said portions of said threaded member, said spacer member engaging said threaded member along two radially spaced axially extending portions and along two axially spaced radially extending portions; and
sealing means disposed within said axially extending portions of said threaded member upon opposite sides of one of said radially extending portions along which said gap is formed between said threaded member and said spacer member.

* * * * *